(No Model.) 2 Sheets—Sheet 1.

G. DE LAVAL.
CENTRIFUGAL APPARATUS FOR TESTING MILK.

No. 365,120. Patented June 21, 1887.

Witnesses
Chas H. Smith
J. Staib

Inventor
Gustaf de Laval
per Lemuel W. Serrell
atty

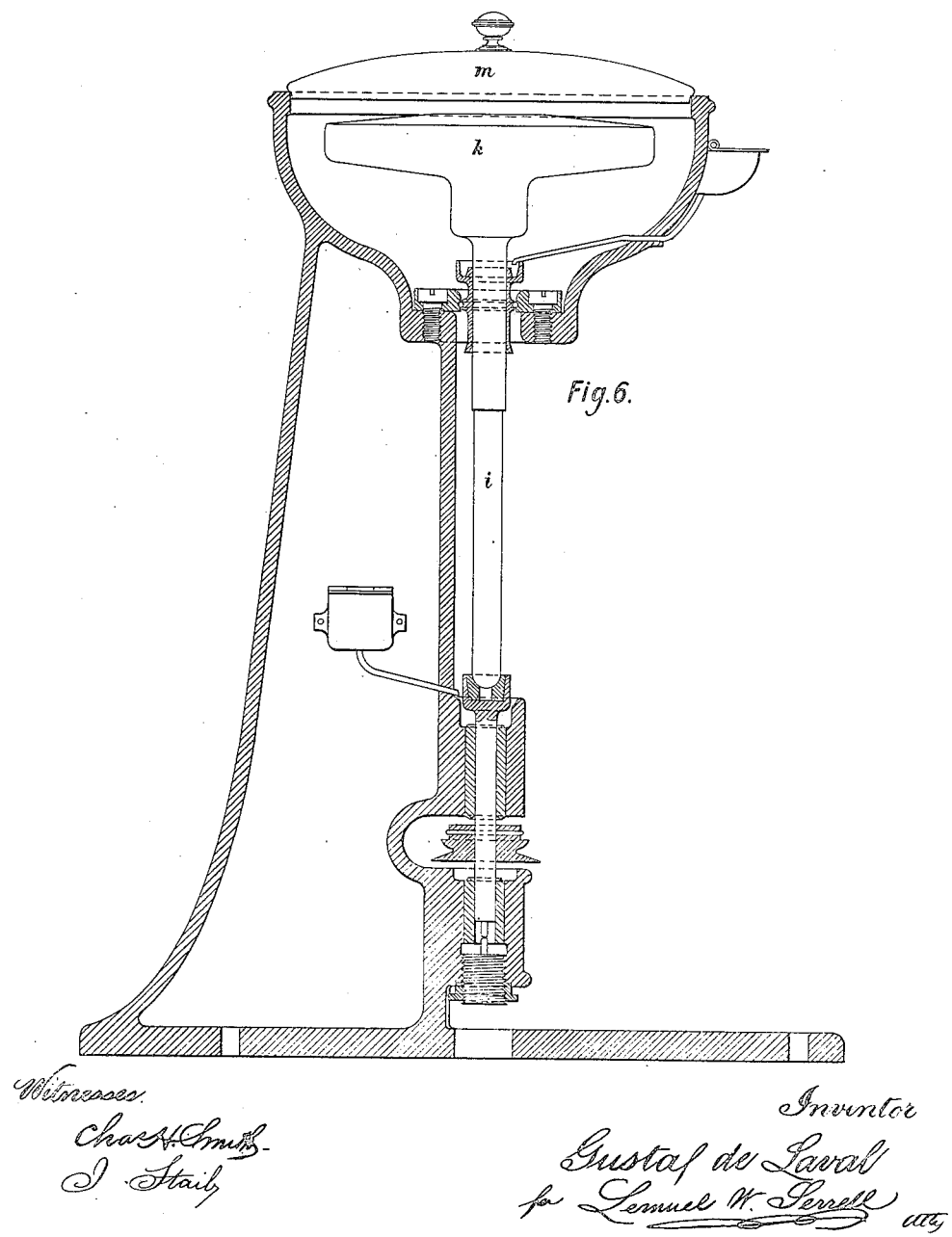

UNITED STATES PATENT OFFICE.

GUSTAF DE LAVAL, OF STOCKHOLM, SWEDEN.

CENTRIFUGAL APPARATUS FOR TESTING MILK.

SPECIFICATION forming part of Letters Patent No. 365,120, dated June 21, 1887.

Application filed August 22, 1885. Serial No. 175,051. (No model.) Patented in Germany July 17, 1885, No. 35,810.

*To all whom it may concern:*

Be it known that I, GUSTAF DE LAVAL, a subject of the King of Sweden and Norway, and a resident of Stockholm, Sweden, have invented certain Improvements in Centrifugal Apparatus for Testing Milk, of which the following is a specification.

The want of a good testing apparatus for milk—that is, one which combines with handiness and simplicity rapidity of operation—has made itself felt, particularly in great dairies collecting their milk from many different farms. The apparatuses hitherto in use for testing milk are of little real use, as they either indicate the percentage of cream of the milk, which does not stand in any fixed relation to the percentage of fat, or they are difficult to manage and complicated. The principal value of the milk, at least for dairies, is the butter-fat contained therein, and therefore milk-testing apparatus, to be of real service, should be arranged to indicate the amount of this fat. By the apparatus described hereinafter the percentage of fat in the milk can be determined with great rapidity and with so great an accuracy that it competes with the chemical analysis. Besides that, the method is so very simple that an unskilled person can make the tests. The object of this testing apparatus is to separate directly from a certain quantity of milk the butter-fat it contains, the volume of which is afterward read. In order to get this fat separated free from caseine the latter should be dissolved. As a dissolving agent, a mixture of acetic acid and sulphuric acid is used. A certain quantity of this mixture is added to a certain quantity of the milk to be tested, and afterward the whole is brought to a suitable temperature and is poured into a vessel provided with a fine tube of glass. This vessel, together with other such vessels, is introduced in a centrifugal apparatus, and by means of the centrifugal force the fat is forced into the tube, where the volume is read. The present portion of my invention, however, relates to the apparatus made use of.

In the annexed drawings is shown an apparatus for testing with the aid of centrifugal force.

Figure 1:
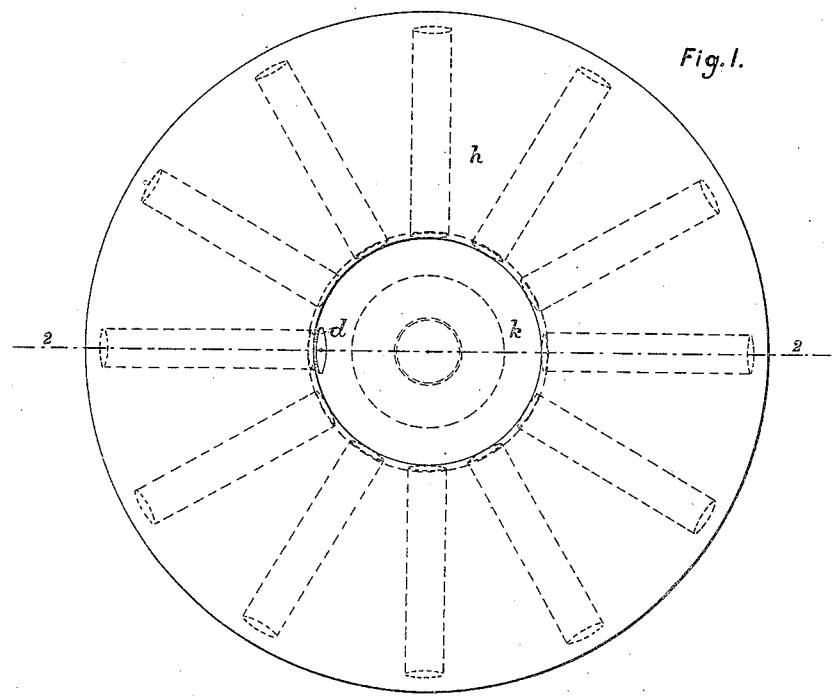
Figure 2:
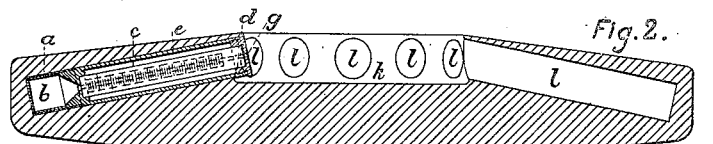
Figures 3, 4, 5:
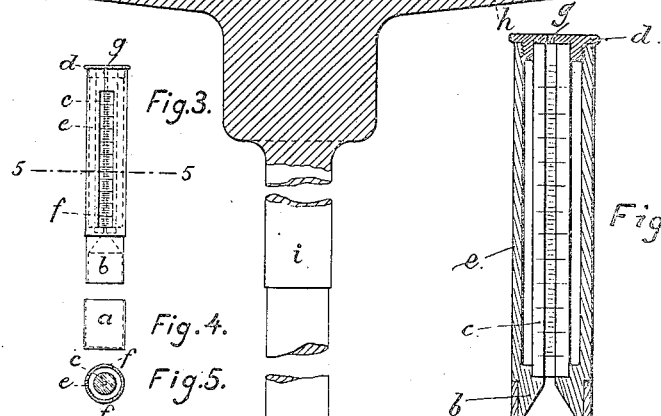
Figure 7:
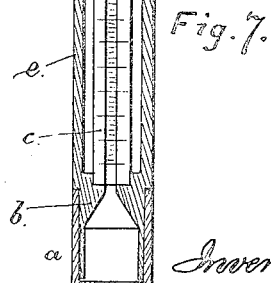

Figure 1 represents a plan of the so-called "plate" into which the different test-vessels to be exposed to centrifugal action are placed. Fig. 2 is a vertical section of the same, along the line 2 2 in Fig. 1, with one test-tube in place. Fig. 3 is an elevation of one of the test-vessels with the lower part or box removed. Fig. 4 is an elevation of the box, and Fig. 5 a cross-section at the line 5 5 in Fig. 3. Fig. 6 is a vertical section of the centrifugal tester mounted to be driven by machine power; and Fig. 7 is a section in larger size of one of the tubes.

The test-vessel consists of a cylindrical silvered metallic box, $a$, into which a likewise-silvered metallic plug, $b$, fits accurately. This plug is turned and bored hollow from the bottom, tapering toward the top into a fine hole communicating with a fine glass tube, $c$, fixed to the plug and either graduated or not graduated. This glass tube is connected with the plug by a nut, $d$, screwed into a slotted tubular socket or holder, $e$, extending from one end of the plug and surrounding the tube, and provided with opposite openings, $f$, so that the degrees on the tube may be read, or the reading may be performed by means of a graduated plate.

The nut is provided with a hole, $g$, so that the plug and the tube constitute conjointly a vessel or channel open at both ends.

$h$ is a steel plate provided with a vertical shaft, $i$. This plate $h$ has in the upper part a recess, $k$, in the walls of which holes $l$ are made for the test-vessels. The apparatus represented on the drawings has twelve such holes; but it may of course also be arranged for other numbers. These holes should preferably be placed radially and a little inclined downward toward the circumference.

The milk is to be prepared for introduction into the test-tubes by heat and acid in a manner which will form the subject of a separate application. The prepared milk is poured into one of the above-described boxes $a$, Fig. 4, until it is full. The plug belonging to the box is then pushed in as far as it will go. The little test-vessel will then be completely filled and the surplus runs through the hole in the nut, and thus an accurately-measured quantity of fluid is obtained. The test-vessel is then pushed—the box foremost—into one of the holes in the plate. In like manner the other specimens to be treated are similarly prepared. The holes in the plate must, previously to the introduction of the test-vessels, be filled with hot water of 50° centigrade or more. The hotter the water is the more the heat of the plate is conserved. Its temperature should be at least 50° centigrade. All the test-vessels having been introduced, a lid, m, Fig. 6, is put on for the purpose of preventing refrigeration. The apparatus is then put in motion with a speed of about six thousand revolutions a minute during three to five minutes. After stopping the apparatus the test-vessels are taken out, and the volume occupied by the fat column in the glass tube is immediately read. The fat being in a melted state, appears quite transparent and clear; but a determined limit can, however, be observed between the fat and the solution of caseine existing beneath. It occurs frequently that a little white plug of caseine is visible between the fat and acid solution. This seldom exceeds the tenth part of a millimeter in length. If the milk is not diluted by water, this plug does not present itself, or only traces thereof are to be seen. The graduations are preferably arranged in such way that one-tenth of the number of divisions occupied by the separated fat just indicates the percentage of the fat contained in the milk. For instance, if 33.5 divisions are read, the milk contains 3.35 per cent. of fat. The reading can very well be carried out to 0.2 division, and thus there occurs an error only of about 0.02 per cent.—say an error of 0.5 per cent. of the weight of the butter-fat in milk of four per cent.

As twelve tests can be made by this apparatus in ten minutes, (the heating of new tests takes place during the testing of the preceding ones,) the great rapidity of seventy-two tests an hour has been attained, and these as accurately made as by means of chemical analysis. After use, the boxes and plugs are rinsed in hot water, and a little such water is blown through the glass tubes. The boxes and the hollow part of the plugs are then carefully wiped.

I claim as my invention—

1. A testing apparatus for milk, composed of a glass tube, a holder for the same having a hollow plug at one end, and a box to hold the milk, and into which the hollow plug fits accurately, substantially as specified.

2. The combination, with removable testing-tubes for holding milk, of a horizontal circular plate having central and radial recesses for the reception of hot water and for the testing-tubes, and a vertical shaft for supporting and revolving the horizontal plate, substantially as specified.

In testimony whereof I have signed my name to this specification in the presence of two subscribing witnesses.

GUSTAF DE LAVAL.

Witnesses:
  NERE A. ELFWING,
  FREDRIK L. ENQUIST.